US011220202B1

(12) United States Patent
Martin

(10) Patent No.: US 11,220,202 B1
(45) Date of Patent: Jan. 11, 2022

(54) KAYAK ROOF RACK

(71) Applicant: David Martin, Bend, OR (US)

(72) Inventor: David Martin, Bend, OR (US)

( * ) Notice: Subject to any disclaimer, the term of this patent is extended or adjusted under 35 U.S.C. 154(b) by 0 days.

(21) Appl. No.: 16/927,074

(22) Filed: Jul. 13, 2020

(51) Int. Cl.
*B60P 3/10* (2006.01)
*B60R 9/042* (2006.01)
*B60R 9/048* (2006.01)
*B60R 9/052* (2006.01)

(52) U.S. Cl.
CPC ............ *B60P 3/1016* (2013.01); *B60R 9/042* (2013.01); *B60R 9/048* (2013.01)

(58) Field of Classification Search
CPC ....... B60P 3/1016; B60R 9/042; B60R 9/048; B60R 9/052
USPC ......... 224/282, 321, 310, 316, 330; 414/462
See application file for complete search history.

(56) References Cited

U.S. PATENT DOCUMENTS

| | | | | |
|---|---|---|---|---|
| 5,297,912 A * | 3/1994 | Levi | ...................... | B60R 9/0423 414/462 |
| 5,827,036 A * | 10/1998 | Steffes | ................. | A61G 3/0209 414/462 |
| 6,149,039 A * | 11/2000 | Englander | ............... | B60R 9/042 224/310 |
| 6,547,507 B1 * | 4/2003 | Gest | ...................... | B60P 1/5433 212/180 |
| 6,561,396 B2 * | 5/2003 | Ketterhagen | ........... | B60R 9/042 224/310 |
| 6,764,268 B2 * | 7/2004 | Levi | ...................... | B60R 9/0423 224/310 |
| 7,717,663 B1 * | 5/2010 | Stowers | .................. | B60P 1/548 414/550 |
| 7,780,050 B2 * | 8/2010 | Tucker | .................... | B60R 9/042 224/310 |
| 8,136,708 B2 * | 3/2012 | Sautter | ...................... | B60R 9/08 224/321 |
| 8,167,180 B2 * | 5/2012 | Bogoslofski | .............. | B60R 9/08 224/325 |
| 9,290,130 B2 * | 3/2016 | Buller | ...................... | B60R 9/10 |
| 9,346,409 B2 * | 5/2016 | Pfaeffli | ..................... | B60R 9/08 |
| 9,688,213 B2 * | 6/2017 | Lisle | ....................... | B60R 9/058 |
| 9,694,756 B2 * | 7/2017 | Pullman | ................ | B60R 9/0423 |
| 9,937,088 B2 * | 4/2018 | Guertler | ................ | B60R 9/0426 |
| 10,124,852 B2 * | 11/2018 | Potticary | ................... | B60R 9/10 |
| 10,246,025 B1 * | 4/2019 | Knigge | .................... | B60R 9/048 |
| 10,780,837 B2 * | 9/2020 | Sautter | .................... | B60R 9/045 |
| 2004/0047716 A1 * | 3/2004 | Hendley | ................ | B60R 9/0423 414/462 |
| 2007/0007316 A1 * | 1/2007 | Witczak | ................. | B60R 9/042 224/310 |
| 2007/0104561 A1 * | 5/2007 | Ito | ........................ | B60P 3/1016 414/543 |
| 2008/0035688 A1 * | 2/2008 | Malone | .................. | B60R 9/042 224/310 |

(Continued)

*Primary Examiner* — Nathan J Newhouse
*Assistant Examiner* — Lester L Vanterpool
(74) *Attorney, Agent, or Firm* — Mark S Hubert

(57) ABSTRACT

A loading and transportation roof rack for the roof of a vehicle. It pivots off of its mounting plate on the vehicle's roof to a position parallel and beside the vehicle so the kayak can be loaded on and lashed down to its C shaped cradle. Thereafter, the roof rack may be tilted vertically onto the vehicle's roof and locked into place. There is a brace that is used to lock the cradle assembly in either the vertical or horizontal positions.

8 Claims, 8 Drawing Sheets

(56) References Cited

U.S. PATENT DOCUMENTS

2014/0205419 A1\* 7/2014 Svaldi ...................... B60R 9/06
414/800

\* cited by examiner

KAYAK ROOF RACK

FIELD

The present disclosure relates, in general, to kayak transportation, and more particularly to a vehicular roof rack for the transportation of a kayak.

BACKGROUND

Many people use self-powered watercraft as their form or exercise and recreation. Getting their watercraft to and from water is always a challenge for many reasons. The roof racks are generally high, and not continually affixed to the vehicle's roof or roof racks/rails. This means they have to be reattached for each use. The watercraft are hard to load onto a vehicle's roof with one person as they are long and awkward to balance with their shifting weight. If not loaded right they can strike the car causing dents or paint damage. Different size kayaks need different racks. Once on the roof positioning them for securement is an ordeal. There are usually no dedicated tie down locations.

Simply stated, the existing kayak roof racks do not consider the height or strength of the person loading the kayak, the size of the kayak, how to get the kayak from beside the vehicle to on its roof, how to tie the kayak down or how to store the kayak in an aesthetic, compact manner on the vehicle's roof.

Henceforth, a vehicular rooftop rack that allows anyone to easily load, securely lash the kayak to the vehicle and be stored on the vehicle's roof in an aesthetically pleasing manner would fulfill a long felt need in the industry. This new invention utilizes and combines known and new technologies in a unique and novel configuration to overcome the aforementioned problems and accomplish this.

BRIEF SUMMARY

In accordance with various embodiments, a kayak roof rack is provided.

In one aspect, a kayak roof rack that pivots down from the roof of the vehicle is provided.

In another aspect, a kayak roof rack that adjusts its width for different sizes of watercraft is provided.

In yet another aspect, a collapsible kayak roof rack that stores in a compact format on the vehicle's roof, and is economical to manufacture, is provided.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF CERTAIN EMBODIMENTS

Figure 1:
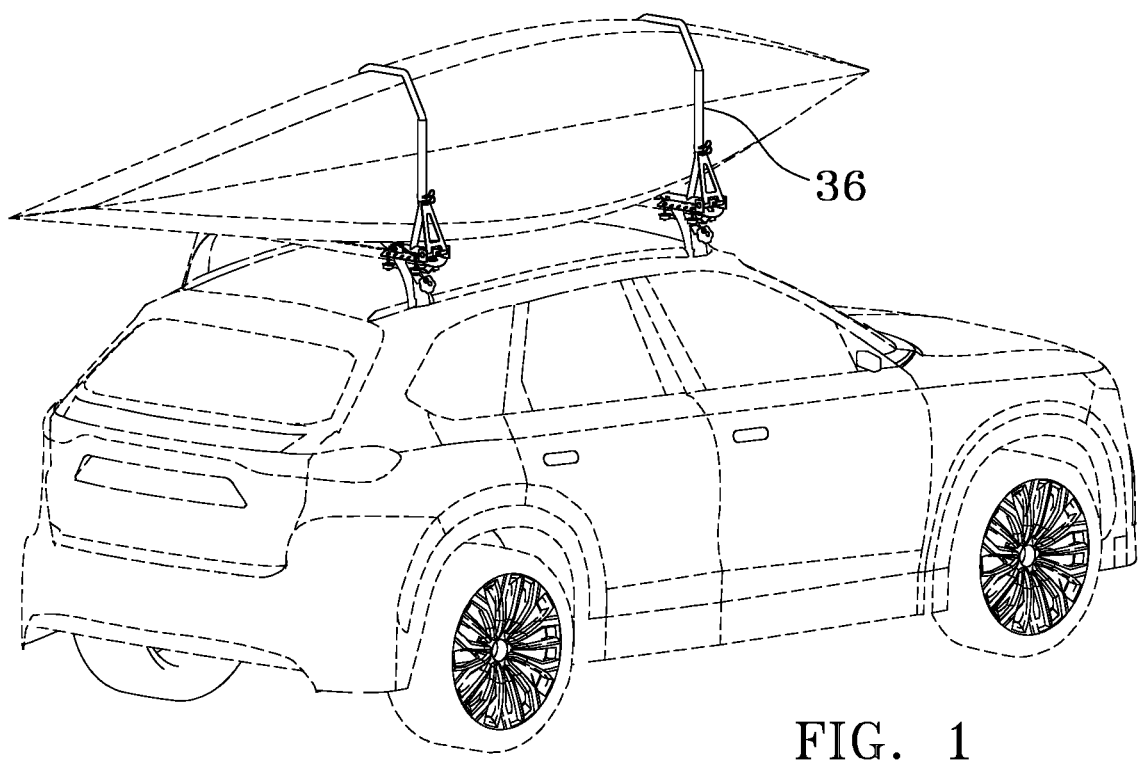
FIG. 1 is a perspective view of a kayak loaded vertically on a vehicle's roof with the kayak roof rack.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the following description, for the purposes of explanation, numerous specific details are set forth in order to provide a thorough understanding of the described embodiments. It will be apparent to one skilled in the art, however, that other embodiments of the present invention may be practiced without some of these specific details. It should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The present invention relates to a novel design for a twin arm vehicular roof rack for a watercraft, ("rack") preferably a kayak, that pivots from off of the roof to a lower position beside the vehicle, where it can have its vertical brace locked into place, its cradle arms extended to accommodate that specific watercraft, the watercraft lashed onto the rack and then tilted into its locked vertical position on the roof of the vehicle. Each arm is identical although one is located at the front of the vehicle and the other is located at the rear of the vehicle.

Figure 10:
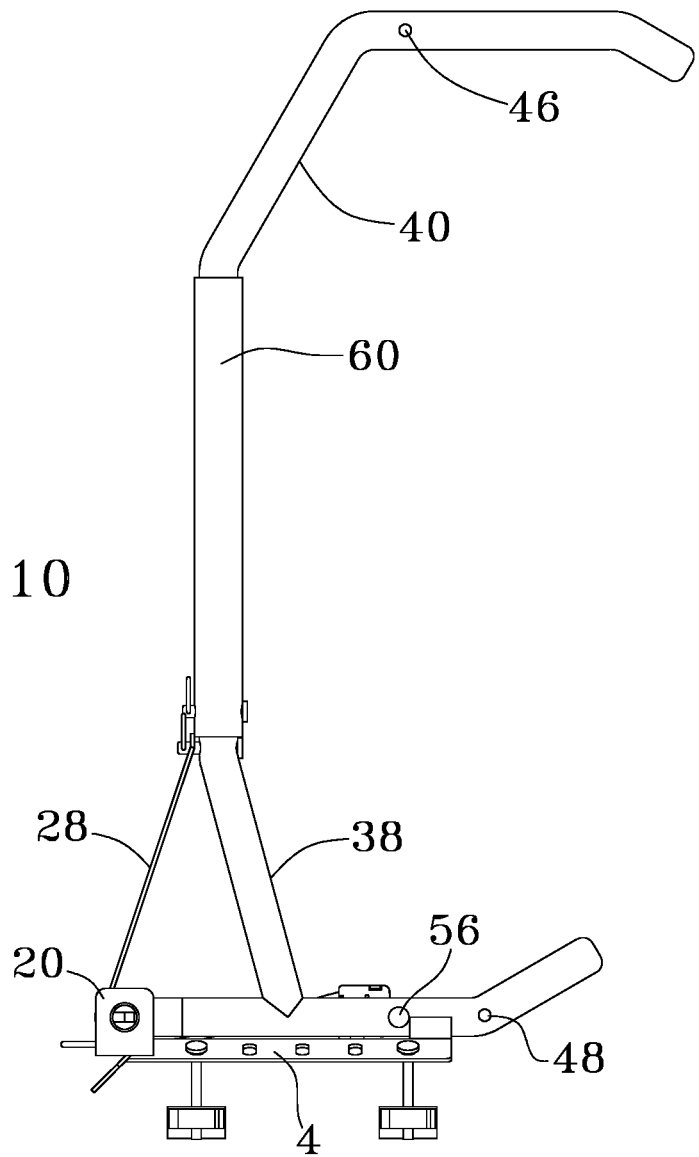
FIG. 10 is a left side view of a vertical kayak roof rack.
Figure 11:
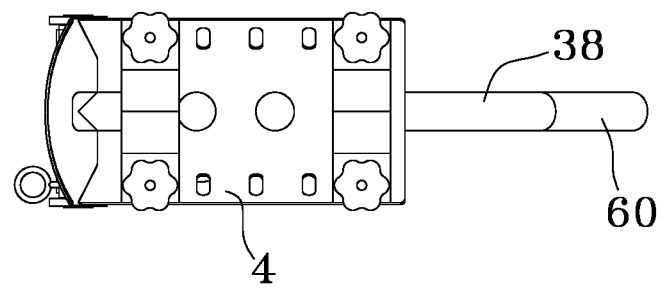
FIG. 11 is a bottom view of a vertical kayak roof rack.

Looking at FIGS. 10 and 11, The rack 2 is affixed to a base plate 4 that has a lower roof mount 6. As depicted herein, the lower roof mount 6 is for frictional engagement with a raised tube or rail roof mount 8 (FIG. 1). It consists of a pair of V notch cinch clamps (FIG. 8) that envelop a raised roof mount 8 and are threadingly engaged with the base plate 4 by mechanical fasteners 10 (preferably thumb screw bolts). The raised tube or rail roof mount 8 is the conventional, most common type of roof mounting system. Different configurations of lower roof mounts are available for different manufacturer's designs of roof mounts. Additionally, there are specialized base plates that lock into certain vehicle's integrated roof tracks. As such, the novel aspects of the kayak roof rack are not tied to the configuration of the lower roof mount but rather are founded on a simple base plate 4 to which different styles of lower roof mounts can be affixed.

Figure 7:
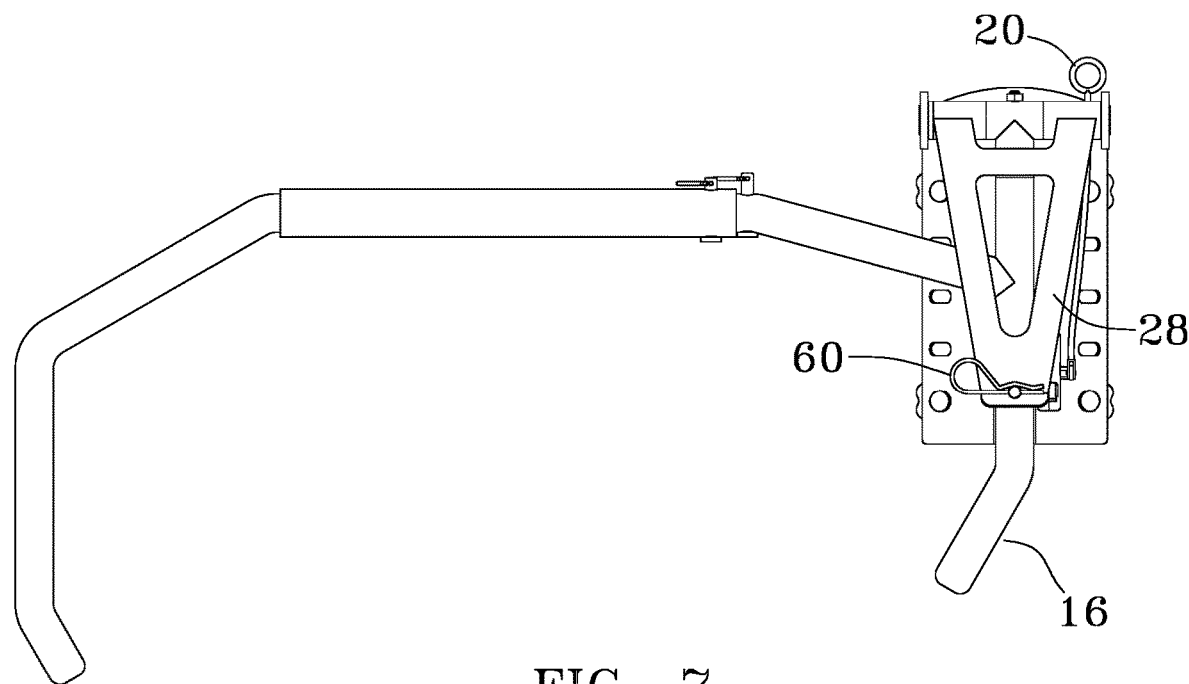
FIGS. 7 and 8 are top and top perspective views of the kayak roof rack in its stored configuration.
Figure 8:
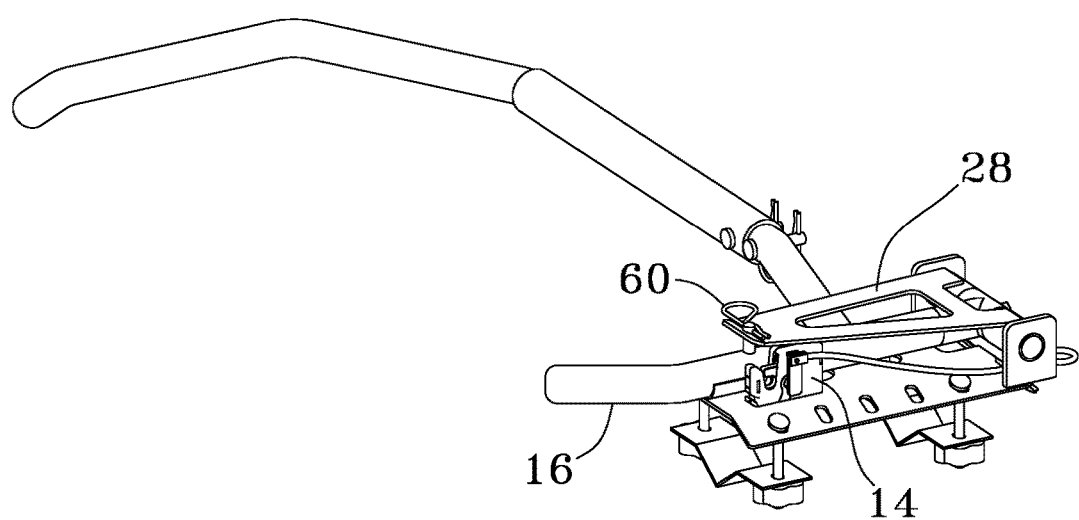

The rack 2 transports a kayak when in the locked vertical position of FIGS. 5, 6 and 9-14, and is stored when in the horizontal position of FIGS. 7 and 8. It is notable that the brace 28 secures the cradle assembly in both the vertical and horizontal positions.

Figure 12:
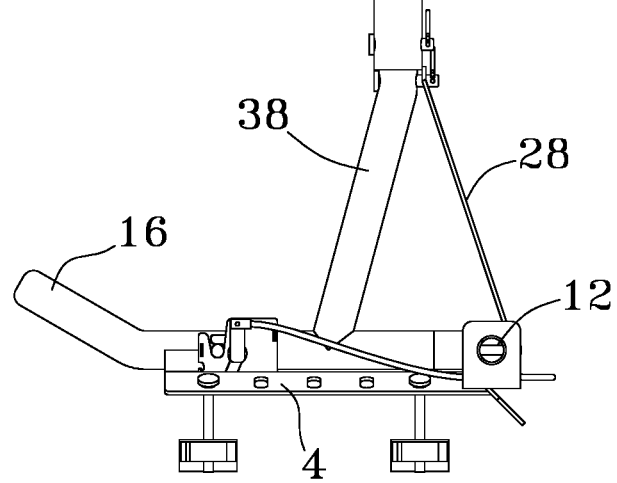
FIG. 12 is a right side view of a vertical kayak roof rack.
Figure 13:
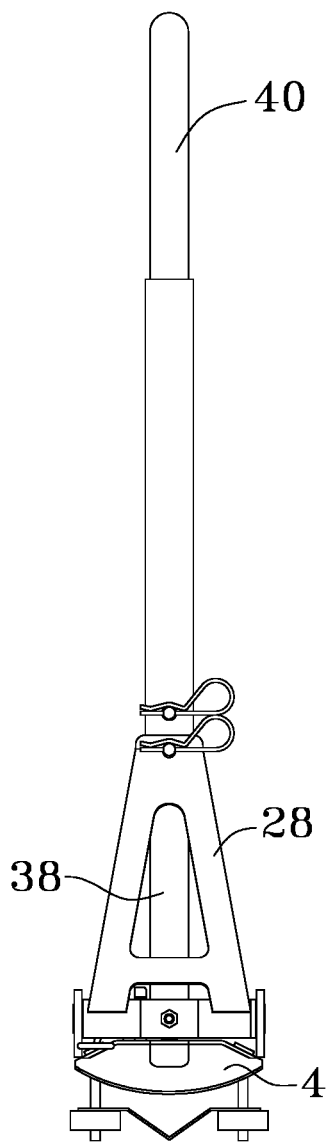
FIGS. 13 and 14 are back and front views of a vertical kayak roof rack.
Figure 14:
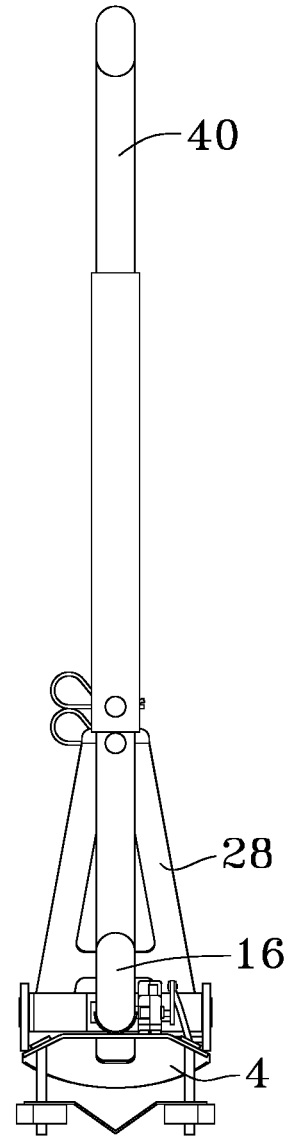
Figure 15:
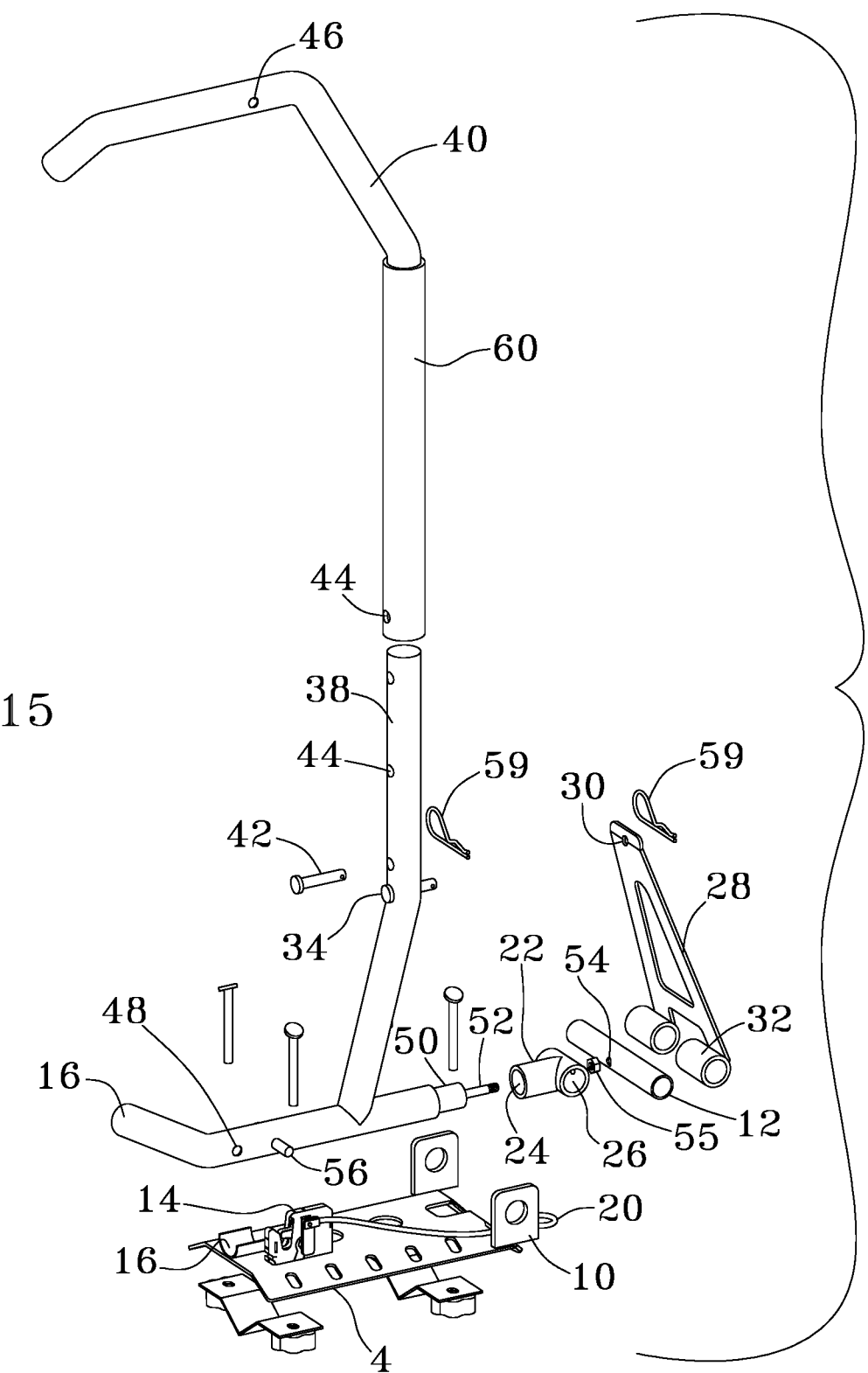
FIG. 15 is a perspective side exploded view of a kayak roof rack.

Looking at FIG. 15, the various components of the rack can best be seen and their interconnections explained. From the distal end of the base plate 4 extending perpendicularly upward are two parallel hinge pin supports 10. These are planar plates with aligned through bores housing the two ends of the hinge pin 12. There is a bi-directional pivot socket 22 made of a T shaped body with two perpendicular through bores. The two through bores are a pivot arm bore 24 and a hinge pin bore 26. There is a brace 28 which is a planar plate with two aligned hinge leaves 32 held in a spaced relationship at its distal end and a locking orifice 30 at its proximal end. The spacing between the hinge leaves 32 corresponds to the width of the bi-directional pivot socket 22 where the hinge pin bore 26 exists. The hinge pin bore 26 in the bi-directional pivot socket 22 has a linear axis that aligns with the common linear axis for the two hinge leaves 32 such that when the hinge pin 12 is inserted through the hinge leaves 32 and the bi-directional pivot socket 22 the proximal end of the brace 28 may be pivoted into a vertical or horizontal position to engage and stabilize the cradle arm (FIG. 12).

Figures 5, 6:
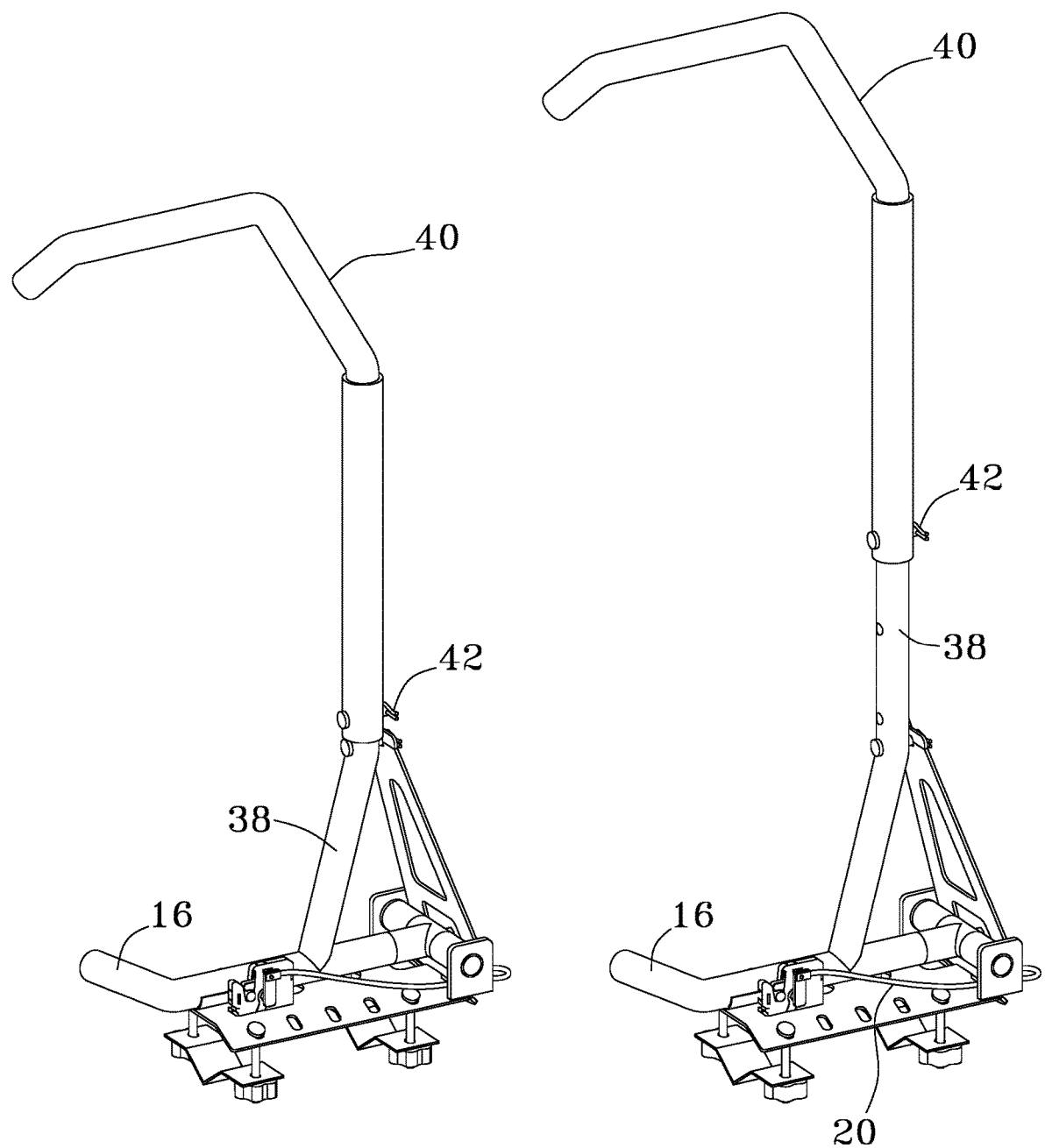
FIGS. 5 and 6 are perspective views of a kayak roof rack in its vertical position with a retracted and an extended cradle arm.

There is a cradle arm assembly 36 that is made of a C shaped tubular body made of a pivot arm 16 having a proximal end and a distal end, with a an inner cradle arm 38 extending perpendicularly between its ends and onto which is telescopically affixed an outer cradle arm 40. The outer cradle arm 40 has an inner diameter that slidingly engages around the outer diameter of the inner cradle arm 38. The inner and outer cradle arms are adjustable and lockable in incremental amounts by the insertion of a locking pin assembly 42 into any of the alignable orifices 44 in the two cradle arms. This is best seen in FIG. 6 where the extension of the outer cradle arm 40 past its pinned position in FIG. 5 is evident. The C shape of the two cradle arm assemblies 36 hold the bottom and both sides of the kayak so that it can be lashed down with rope, straps or the equivalent between the left and right tie down orifices 46 and 48 and tilted vertically onto its side.

The proximal end of the pivot arm 50 is sized for insertion and rotation engagement within the pivot arm bore 24 of the bi-directional pivot socket 22. There is also a threaded stud 52 extending from the proximal end that passes through a through bore 54 in the hinge pin 12 and the bi-directional pivot socket 22 and is threadingly engaged with a nut 55. This keeps the cradle arm assembly 36, the hinge pin 12 and the brace 28 all locked onto the bi-directional pivot socket 22 which is now permanently affixed between the hinge pin supports 10. There is also a brace lock stud 34 located on the inner cradle arm 38 that aligns with the locking orifice 30 in the distal end of the brace to secure the brace to the cradle assembly with a lock pin 59.

On the proximal end of the base plate 4 is a circular latch 14 and a pivot arm rest 14. The pivot arm rest is a curved semi-circular plate having an inner diameter larger than the outer diameter of the pivot arm 16 such that the pivot arm 16 may rest in it and not extent so as to scratch the roof of the vehicle. Attached to the circular latch is a remote latch actuator 20 which in the preferred embodiment is a cable with pull loop attached to the latch actuator on the circular latch 14. Extending normally from the pivot arm 16 is a locking stud 56 that is engageable within the circular latch 14 to lock the cradle arm assembly 36 in its vertical position when the kayak is loaded onto the vehicle's roof. The locking stud 56 resides on the pivot arm 16 perpendicularly to the cradle arms.

This locking stud 56 also has a second function to lock the brace 28 over the pivot arm 16 when the pivot arm 16 is rotated into its horizontal position for storage on the vehicle's roof as seen in FIGS. 7 and 8. In this role the locking stud 56 passes through locking orifice 30. Like the other locking pin/stud assemblies on the rack 2, the stud or pin has a cross drilled orifice that accommodates a removeable pin to secure the brace 28 and the pivot arm 16 in their horizontal position. At this time the pivot arm 16 is securely seated onto its pivot arm rest 14.

Figure 2:
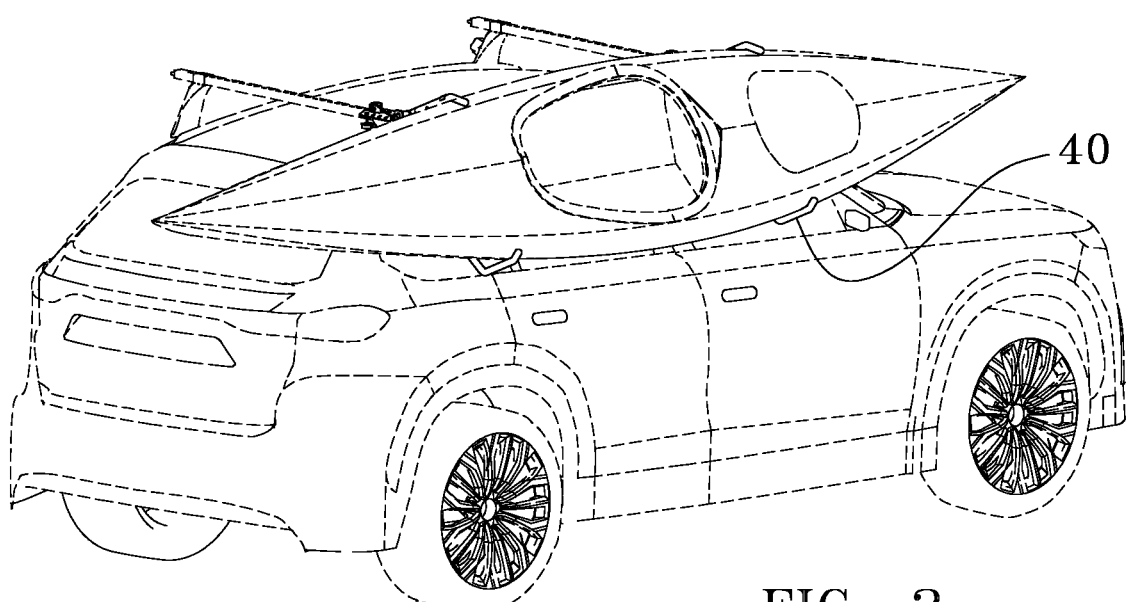
FIG. 2 is a perspective view of a kayak loaded into the kayak roof rack's cradle arms prior to its vertical tilt onto the vehicle's roof.
Figure 3:
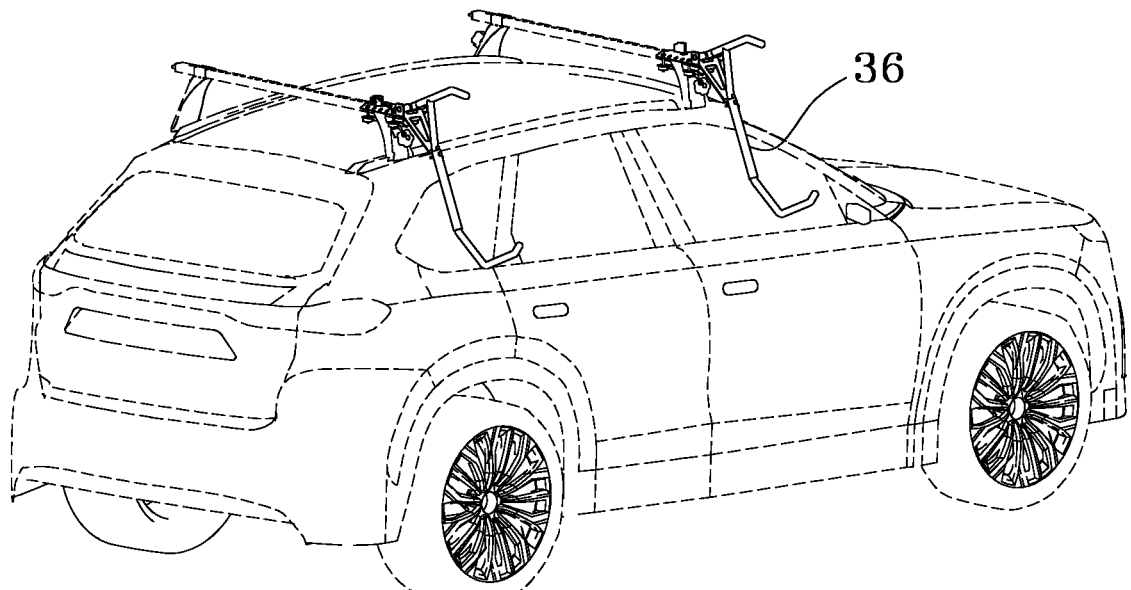
FIG. 3 is a perspective view of a kayak roof rack with its cradle arms pivoted off of the vehicle's roof.
Figure 4:
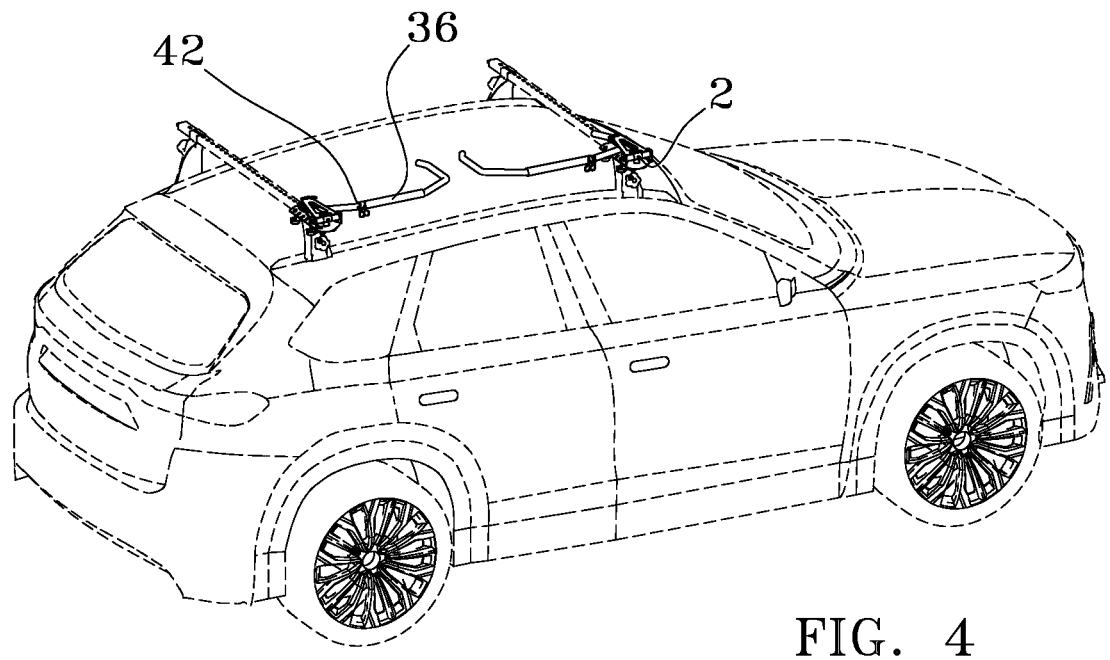
FIG. 4 is a perspective view of a kayak roof rack in its collapsed, stored position on the vehicle's roof.

Looking sequentially at FIGS. 4, 3, 2 and 1 with reference to FIG. 15, the loading process of a kayak can best be seen and explained. In FIG. 4 the rack 2 is in its horizontal, stored position. Here, the cradle arm assembly 36 has been reduced to is smallest configuration with the outer cradle arm 40 slid over the inner cradle arm 38 as far as possible and locked by the insertion of the locking pin assembly 42 into a pair of aligned orifices 44 in the two cradle arms. The pivot arm 16 (while resting in its pivot arm rest 14) has been rotated in the bi-directional pivot socket 22 until the cradle assembly rests on the vehicles roof. The only contact points each of the cradle arm assemblies 36 has with the roof is the foam sleeve 60 over the outer cradle arm 40. The brace 28 has been pivoted on top of the pivot arm 16 and its lock orifice 30 slid over the locking stud 56 with a locking pin inserted therethrough. (FIGS. 7 and 8 depict this rack configuration.)

Figure 9:
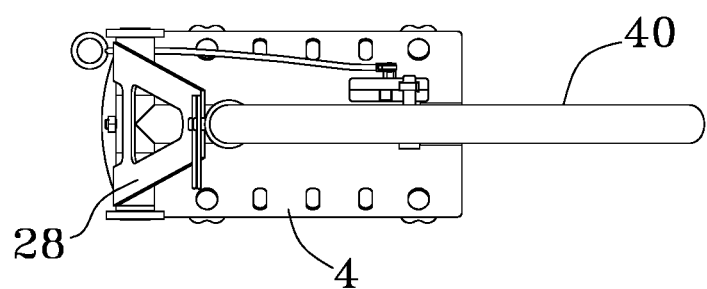
FIG. 9 is a top view of a vertical kayak roof rack.

In FIG. 3 the locking pin has been removed from the locking stud 56 and the brace 28 pivoted from off of the pivot arm 16. The pivot arm 16 (and cradle assembly 36) while still in its pivot arm rest 14, has been pivoted into a vertical position on the vehicle roof. The locking stud 56 has been engaged into the circular latch 14 to hold the cradle assembly 36 vertical. The brace 28 has been locked to the vertical pivot arm 16 with a locking pin. (FIGS. 9, 10 and 12 depict this rack configuration.) The cradle arm assembly 36 is now tilted off of the side of the vehicle such that the pivot arm 16 leaves its pivot arm rest 14 and the cradle arm assembly 13 extends horizontally past the side of the vehicle. The outer cradle arm 40 is extended from the inner cradle arm 38 to accommodate the size of the kayak, and a locking pin used to secure the relative positions of the outer and inner cradle arms 38 and 40.

In FIG. 2 the kayak has been loaded onto the two cradle arm assemblies 36. The outer and inner cradle arms 40 and 38 are drawn in tight to the side of the kayak and their relative positions adjusted and secured again with the locking pin. Straps, ropes or the like are fed through left and right tie down orifices 46 and 48, and the kayak is lashed into position.

In FIG. 1 it can be seen that the kayak in the cradle arm assemblies 36 is tilted into a vertical position on the vehicle roof and the locking stud 56 is locked into the circular latch 14. The kayak is now ready for secure transportation. The removal of the kayak and the return of the rack 2 into is storage position is accomplished reversal of the above steps.

While certain features and aspects have been described with respect to exemplary embodiments, one skilled in the art will recognize that numerous modifications are possible. Moreover, while the procedures of the methods and processes for building, assembling and using the rack described herein are described in a particular order for ease of description, unless the context dictates otherwise, various procedures may be reordered, added, and/or omitted in accordance with various embodiments.

This detailed description is intended to be illustrative only, and should not be taken as limiting the scope of the inventive concept. What is claimed as the invention, therefore, is all such modifications as may come within the scope and spirit of the following claims and equivalents thereto.

Having thus described the invention, what is claimed as new and desired to be secured by Letters Patent is as follows:

1. A kayak vehicular roof rack comprising:
   a base plate with a pair of hinge pin supports extending therefrom;
   a hinge pin;
   a brace with a first distal end and a first proximal end, having a pair of hinge leaves formed thereon said first proximal end;
   a bi-directional pivot socket having a pivot arm bore and a perpendicularly disposed hinge pin bore, said bi-directional pivot socket pivotally affixed to said base plate and to said brace by said hinge pin passing through said pair of hinge leaves, said hinge pin bore and said pair of hinge pin supports;
   a cradle assembly made of a pivot arm having a second distal end and a second proximal end, therebetween from which extends perpendicularly an inner cradle arm onto which is telescopically affixed an outer cradle arm, wherein said second proximal end is pivotally connected into said pivot arm bore;
   wherein said brace is connectable to said pivot arm.

2. The kayak vehicular roof rack of claim 1 further comprising:
   a circular latch extending perpendicularly from said base plate;
   a locking stud extending from said pivot arm perpendicularly to said inner cradle arm, wherein said locking stud is constrainable within said circular latch when said pivot arm is vertical;
   a locking orifice formed at said first distal end of said brace wherein said locking stud is constrainable within said locking orifice of said brace with a lock pin when said inner cradle arm is horizontal.

3. The kayak vehicular roof rack of claim 1 wherein said cradle assembly has a C shape configuration formed between said pivot arm and said outer cradle arm.

4. The kayak vehicular roof rack of claim 1 further comprising a left tie down orifice on said pivot arm and a right tie down orifice on said outer cradle arm.

5. A kayak vehicular roof rack comprising:
   a base plate;
   a T shaped bi-directional pivot socket having a pivot arm bore and a perpendicularly disposed hinge pin bore, said T shaped bi-directional pivot socket pivotally mounted on said base plate;
   a cradle assembly pivotally connected into said T shaped bi-directional pivot socket;
   a brace pivotally connected into said T shaped bi-directional pivot socket, said brace connectable at two different locations on said cradle assembly.

6. The kayak vehicular roof rack of claim 5 wherein said pivot arm has a proximal end pivotally connected in said pivot arm bore of said T shaped bi-directional pivot socket, and wherein said brace is pivotally connected about a hinge pin passing through and extending therefrom said hinge pin bore in said T shaped bi-directional pivot socket.

7. The kayak vehicular roof rack of claim 6, wherein said cradle assembly has a C shape configuration and is made of a pivot arm having two ends where there between said ends an inner cradle arm extends perpendicularly with an outer cradle arm telescopically affixed thereon.

8. The kayak vehicular roof of claim 7 further comprising a threaded stud extending from said proximal end of said pivot arm, said stud passing through an axial orifice formed through said hinge pin and threadingly engaged to a nut.

* * * * *